United States Patent
Chapman et al.

(10) Patent No.: US 7,376,806 B2
(45) Date of Patent: May 20, 2008

(54) EFFICIENT MAINTENANCE OF MEMORY LIST

(75) Inventors: Ronald J. Chapman, Tucson, AZ (US);
Gary W. Batchelor, Tucson, AZ (US);
Michael T. Benhase, Tucson, AZ (US);
Kenneth W. Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 10/991,109

(22) Filed: Nov. 17, 2004

(65) Prior Publication Data

US 2006/0117213 A1    Jun. 1, 2006

(51) Int. Cl.
G06F 12/00     (2006.01)
G06F 13/00     (2006.01)
G06F 13/28     (2006.01)

(52) U.S. Cl. ...................................................... 711/170
(58) Field of Classification Search ................. 711/170
See application file for complete search history.

(56) References Cited

U.S. PATENT DOCUMENTS 6,252,876 B1 *  6/2001  Brueckheimer et al. ..... 370/394
6,502,174 B1 * 12/2002  Beardsley et al. .......... 711/170

* cited by examiner

*Primary Examiner*—Matthew Kim
*Assistant Examiner*—Edward J Dudek
(74) *Attorney, Agent, or Firm*—Dan Shifrin

(57) ABSTRACT

Data management systems, such as used in disk control units, employ memory entry lists to help keep track of user data. Improved performance of entry list maintenance is provided by the present invention. Much of the protocol employed to conduct such maintenance is preferably performed by hardware-based logic, thereby freeing other system resources to execute other processes. New entries to the memory list are only allowed at predetermined addresses and entries are updated by writing a predetermined data pattern to a previously allocated address. Optionally, improved error detection, such as a longitudinal redundancy check, may also be performed in an efficient manner during entry list maintenance to assure the integrity of the list.

20 Claims, 9 Drawing Sheets

EFFICIENT MAINTENANCE OF MEMORY LIST

RELATED APPLICATION DATA

The present application is related to commonly-assigned and co-pending U.S. application Ser. No.10/990,882, entitled METHOD AND SYSTEM FOR PERFORMANCE ENHANCEMENT IN A POLLED DATA STORAGE ENVIRONMENT, filed on the filing date hereof, which application is incorporated herein by reference in its entirety.

TECHNICAL FIELD

The present invention relates generally to computer data systems and, in particular, to maintaining and updating entries in a memory list.

BACKGROUND ART

In a data processing system, or in a component such as a disk control unit, customer data is frequently moved between storage elements, such as external storage drives, internal processor memory, conventional volatile RAM, non-volatile memory, etc. A list is typically maintained of entries which are associated with the data. Entries may include memory addresses, pointers or other means of identifying the data which is being moved. Entry lists conventionally have been built and maintained through instructions executed by a controller processor. However, building and maintaining a list consumes valuable processor resources. Moreover, spurious writes to the list may be undetected or an entry in the list may be corrupted, possibly leading to data being lost or unavailable and placing the integrity of the list in question.

Consequently, a need remains for a means of maintaining an entry list which is efficient and relieves the controller processor from at least some of its former responsibilities. There remains a further need to maintain an entry list while enhancing the ability to detect errors.

SUMMARY OF THE INVENTION

The present invention provides a protocol for managing memory entry lists in a data management system, such as a disk control unit. Preferably, the protocol is implemented substantially in hardware, thus freeing other system resources to execute other processes. Additionally, improved error correction may be performed as the list is being built and updated.

The list is initially built by adding new entries to pre-allocated space, each space having an address. A first entry is added to space having a first address and a pointer is set to reference the first address. If error checking is enabled, an error check value is generated. The next entry is added to space having the next address, the pointer is incremented to point to the next address and the error check value is updated. The process continues until all entries have been added to the list.

The list is updated by first determining if the update is the removal of an interstitial entry or of the last (most recently added) entry. If the update is the removal of an interstitial entry, that entry is removed from the list and, if error checking is enabled, the error check value is updated. The last entry is then written to the space vacated by the removed interstitial entry and a predetermined value which is neutral relative to the error checking procedure (such as all zeros) is written to the space vacated by the former last entry. The pointer is decremented to now reference the address "below" the former last entry; the entry stored in this address is the new last entry.

If the update is the removal of the last entry, the last entry is removed from the list and, if error checking is enabled, the error check value is updated. A predetermined neutral value is then written to the space vacated by the last entry and the pointer is decremented to now reference the address "below" the former last entry; the entry stored in this address is the new last entry.

The protocol, including error checking if enabled, is efficient and may be implemented substantially in hardware.

DETAILED DESCRIPTION OF THE PREFERRED EMBODIMENT

Figure 1:
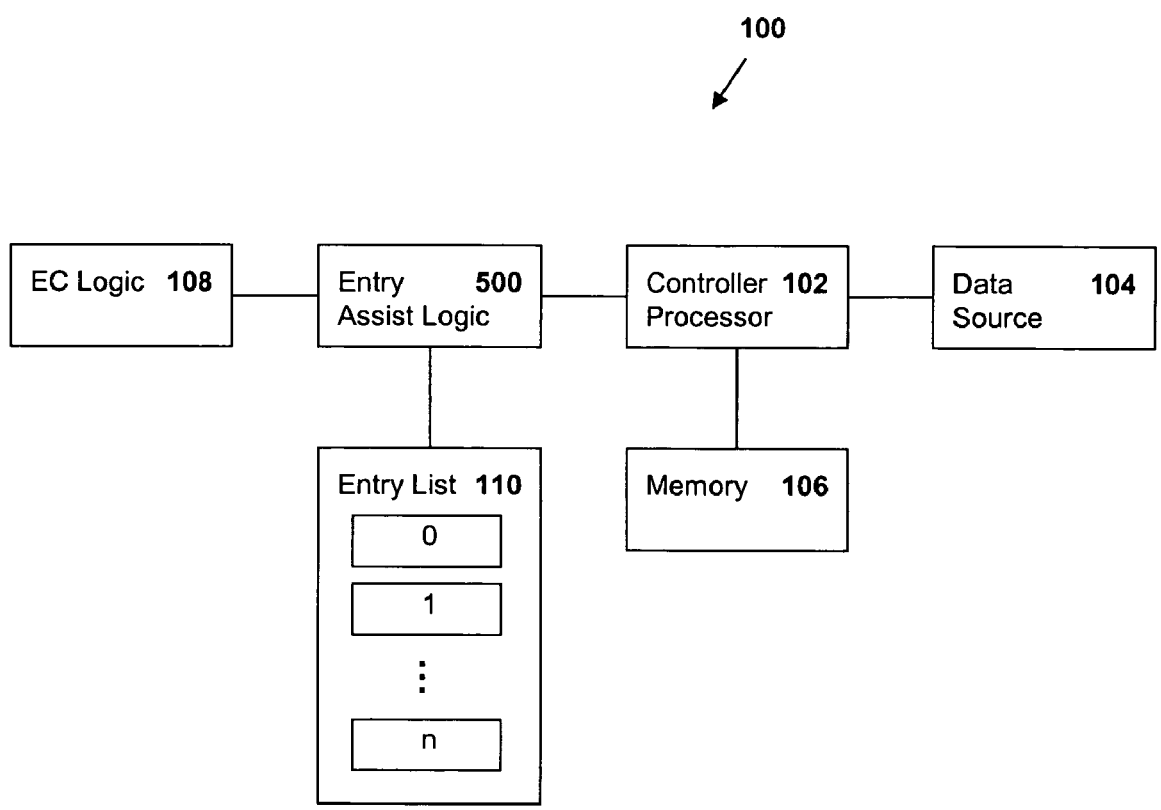
FIG. 1 is a block diagram of a data management system of the present invention.

The present invention provides an improved entry list management protocol and employs hardware logic to reduce spurious writes to the list and to reduce the burden on the controller processor. Optionally, the present invention may also include improved error detection to enhance the integrity of the memory list. FIG. 1 is a block diagram of a data management system 100 of the present invention. Such a system may be any data management system in which a contiguous entry list is maintained, including fixed or removable magnetic disk storage systems, tape storage systems or other media storage systems. In one embodiment, the system 100 comprises a disk control unit. The system 100 includes a controller processor 102 which is attached to a data source 104, such as a disk array, and to a memory device 106, which may be used to store instructions executable by the processor 102. The system 100 further includes entry assist logic 500 which interfaces with an entry list 110 and executes the list management protocol. Preferably, the system also includes error checking (EC) logic 108 for enhanced performance. In one embodiment, the error checking logic 108 may perform a longitudinal redundancy check (LRC); however, other error checking procedures, including those with correction capability, may be employed in the present invention.

The entry list 110 may reside in a memory (including the memory device 106) or may reside in a register. The entry list 110 initially comprises empty spaces which have been allocated to the list 110, each of which has an address, such as 0-n, for a predetermined number of future entries.

Figure 2A:
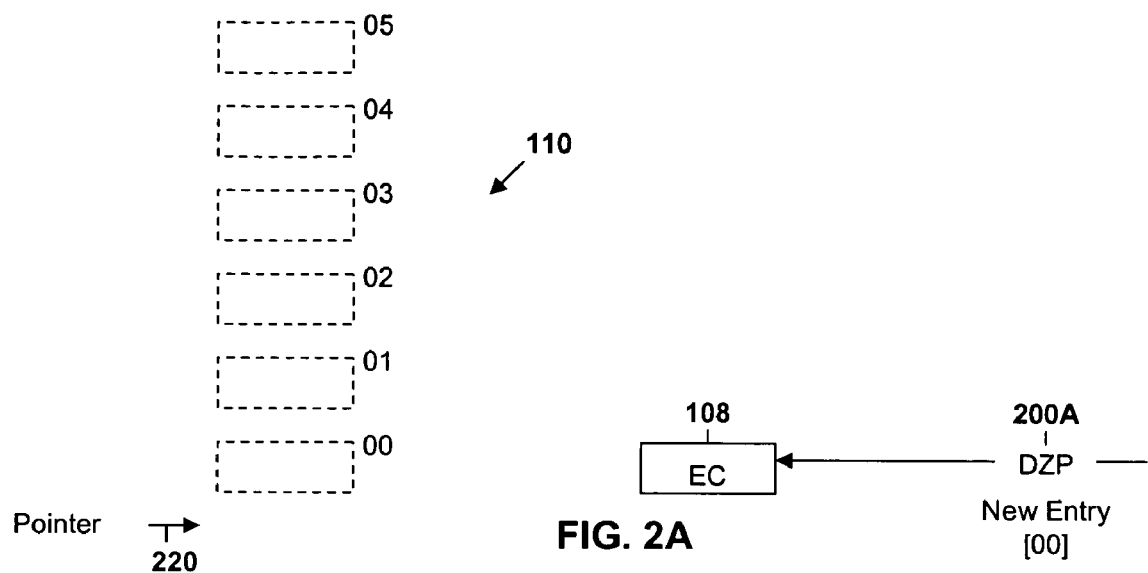
FIGS. 2A-2E graphically illustrate a process in which a memory entry list is built in accordance with the present invention.
Figure 2B:
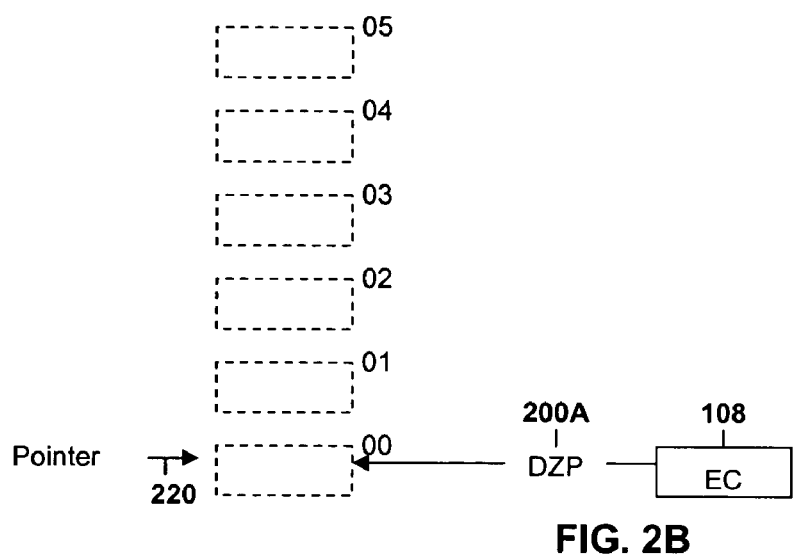
Figure 2C:
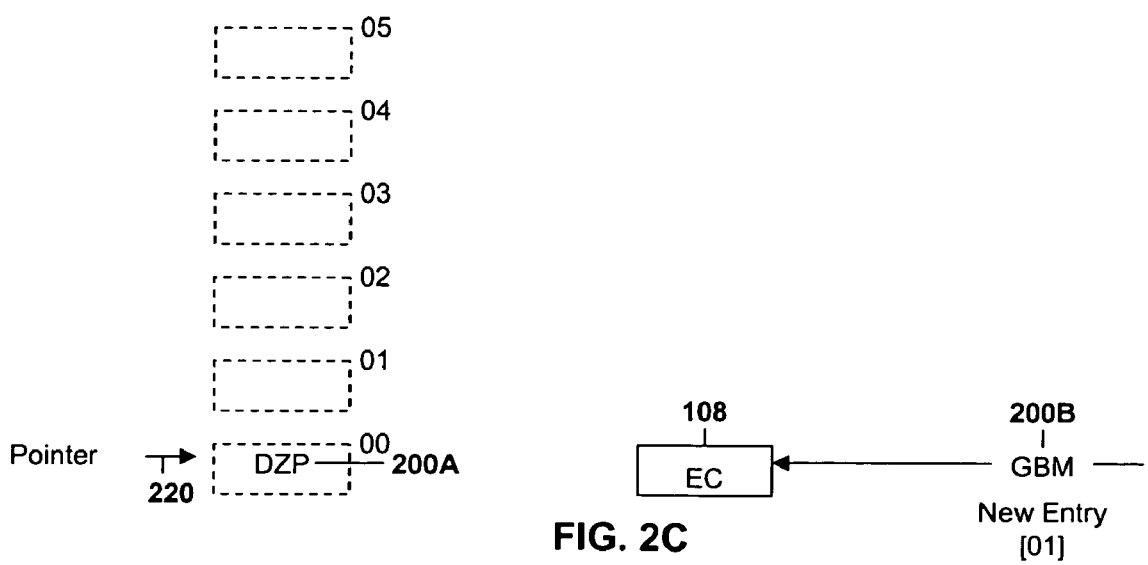
Figure 2D:
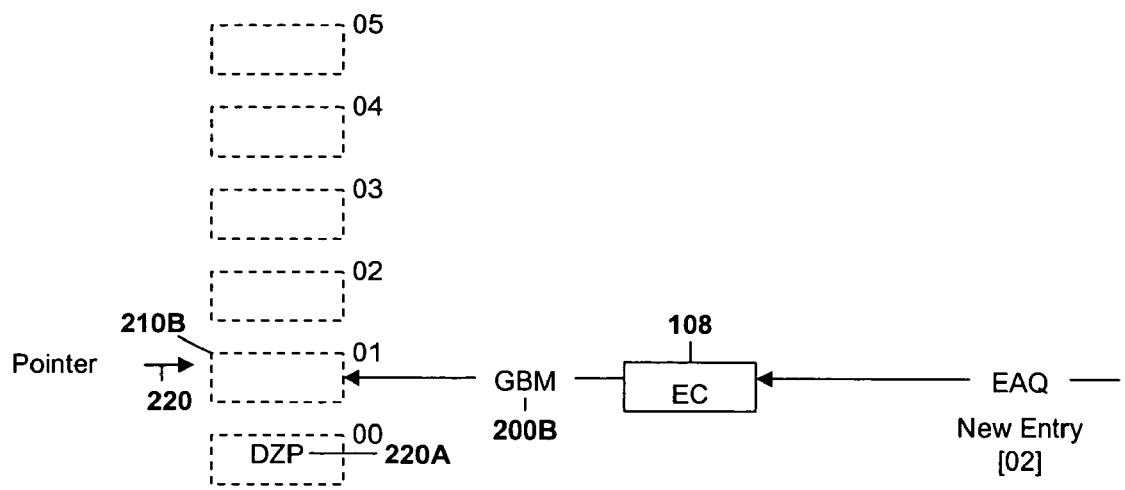
Figure 2E:
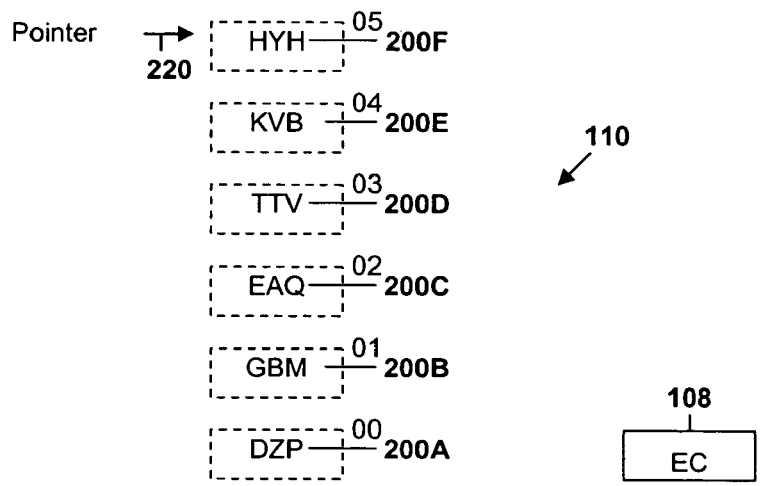

As illustrated in FIGS. 2A-E, when the entry list 110 is being built each new entry is added to the empty space with the lowest address in the list 110. This is the most recently added entry and is designated the "last entry". Preferably, each new entry is processed through EC logic 108 (FIG. 2A)

before being stored in the list. For example, the new entry data DZP (letters chosen at random) 200A is optionally but preferably processed through the EC logic 108 which generates an error check value. The entry 200A is then written to the lowest empty space, in this case the space having 00 as its address (FIG. 2B). A pointer 220 is incremented to reference the address in which the last entry is stored. The next new entry data GBM 200B is processed through the EC logic 108 (FIG. 2C), which updates the error check value. The entry 200B is then written to the next available space (address 01) and the pointer is incremented to reference the new last entry (FIG. 2D). The process continues until the entry list 110 is filled (FIG. 2E), the EC logic 108 has generated a fully updated error check value and the pointer references the most recently added (last) entry space (address 05 in the FIG.).

Figure 3A:
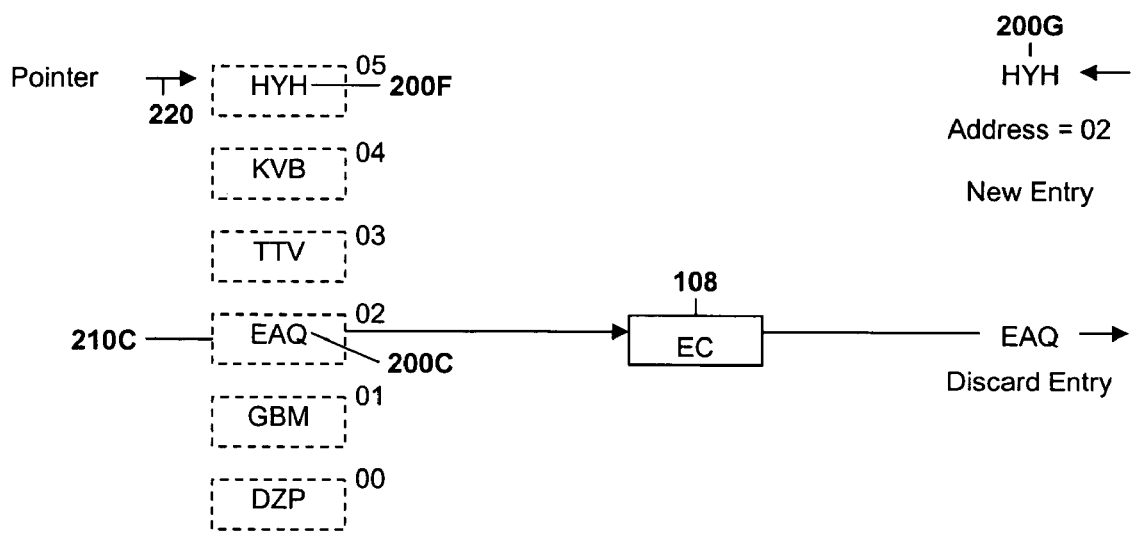
FIGS. 3A-3D graphically illustrate a process in which an interstitial entry is removed in accordance with the present invention.
Figure 3B:
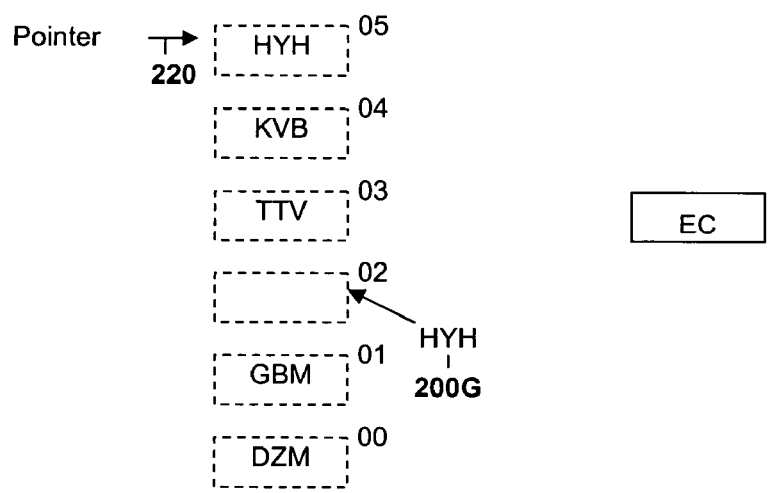
Figure 3C:
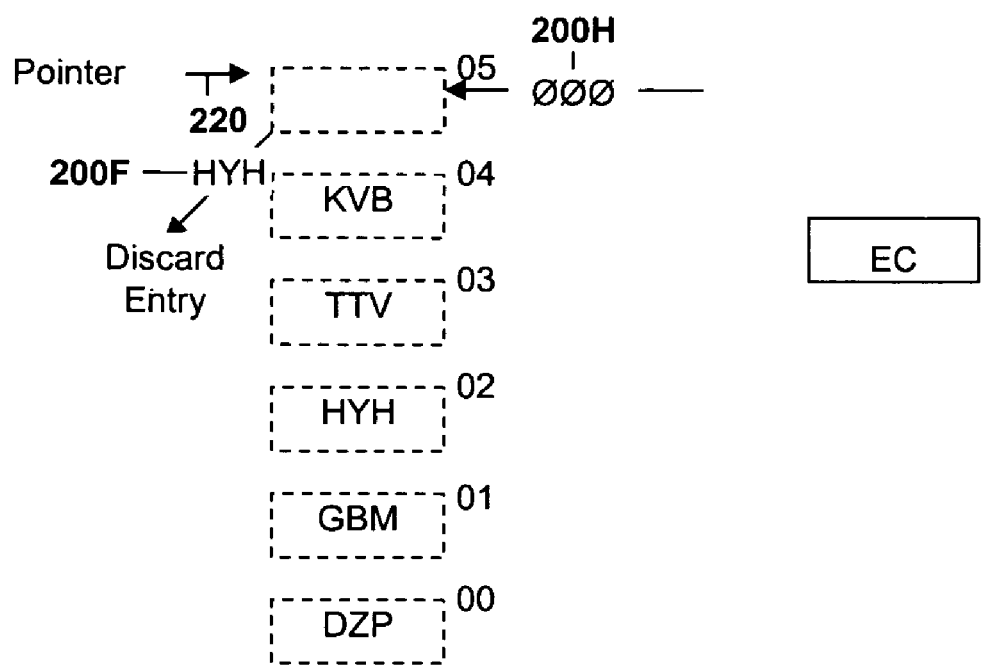
Figure 3D:
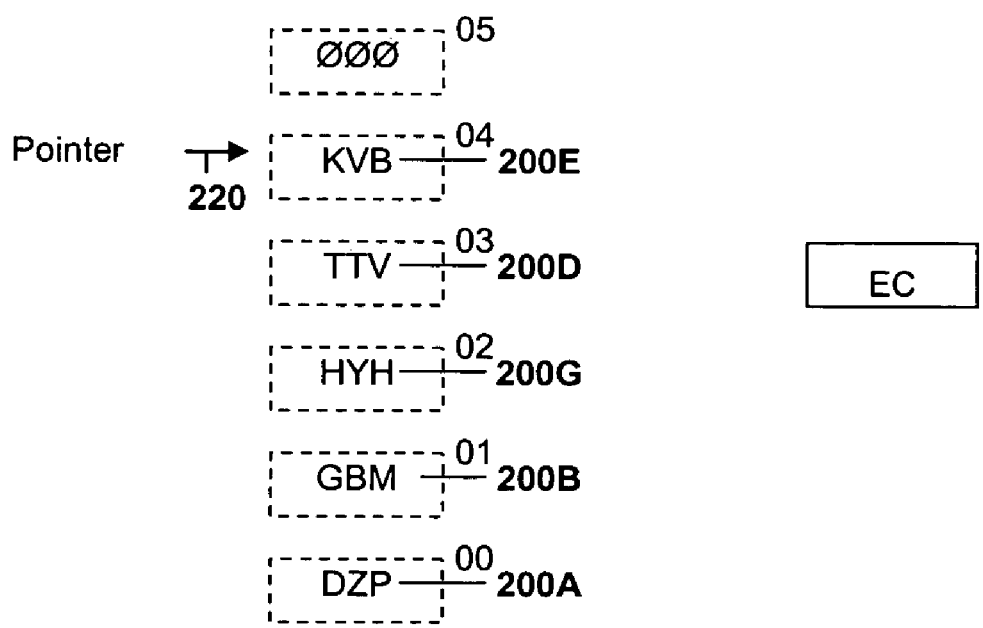

After the entry list has been built, entries may be updated or removed. FIGS. 3A-D illustrate the manner in which an interstitial entry, such as EAQ 200C in address space 02 may be removed according to the present invention. First, a new entry 200G is compared with the last entry 200F; both entries are the same (HYH). The target address of the new entry 200G is 02 and is compared with valid list addresses. If the target address is not a valid list address, an error is noted. Because the target address is determined to be a valid address, the old (interstitial) entry 200C is then removed from the list 110 and processed through the EC logic 108 which updates the error check value (FIG. 3A). The old entry EAQ 200C is then discarded and, to fill the now empty space at address 02, the new entry 200G replaces the discarded entry (FIG. 3B). Because the last entry data 200F is the same as the new entry data 200G, the last entry 200F is discarded and replaced by a value 200H, such as 000, which is neutral with respect to the error checking logic 108 (FIG. 300C). Consequently, it is not necessary to again update the error check value again. Finally, the pointer 220 to the last entry is adjusted such that the entry 200E (KVB) is referenced as the last entry. In this manner, the last entry space is freed and gaps in the list are closed.

Figure 4A:
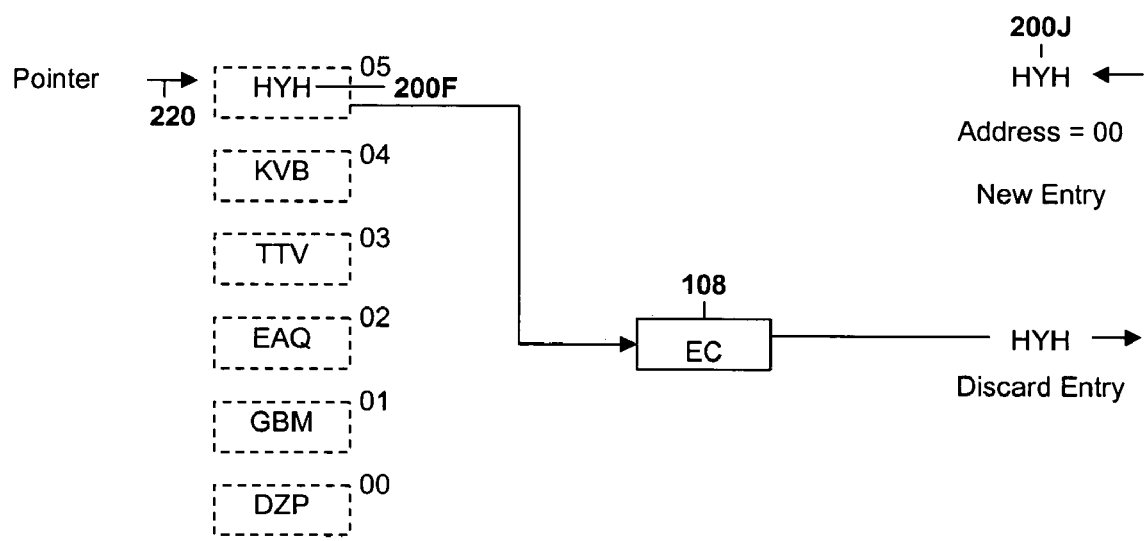
FIGS. 4A-4D graphically illustrate a process in which the last entry is removed in accordance with the present invention.
Figure 4B:
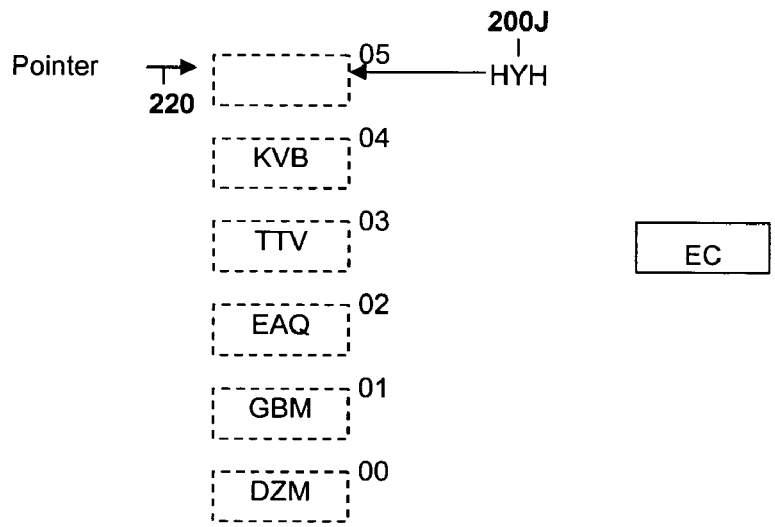
Figure 4C:
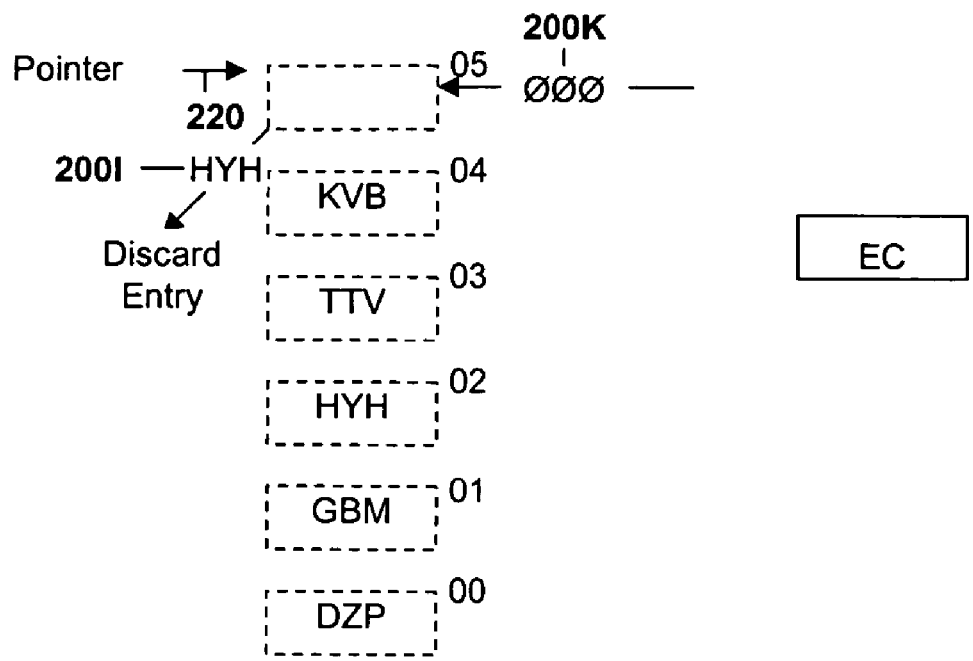
Figure 4D:
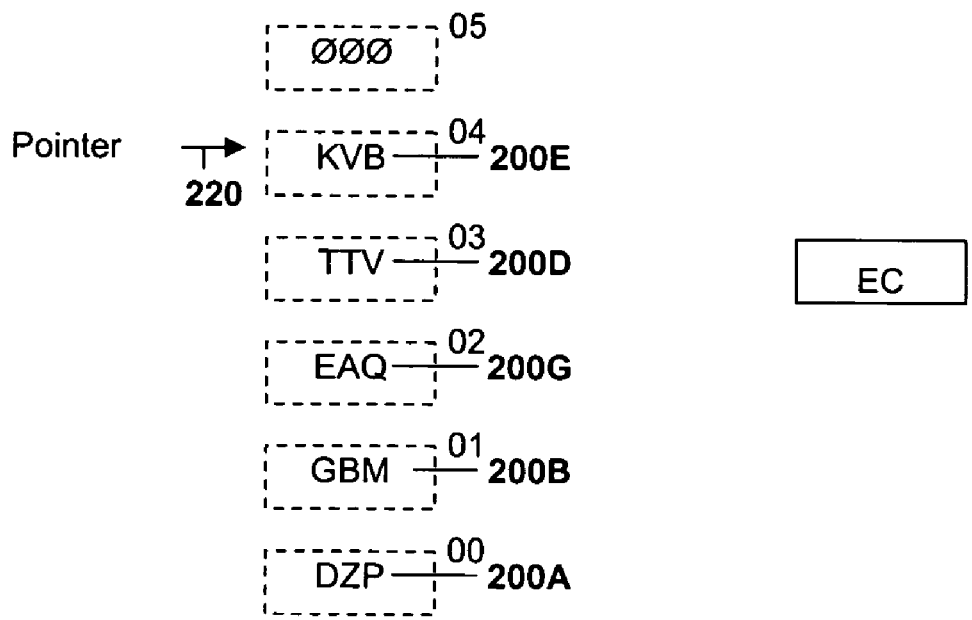

FIGS. 4A-D illustrate the manner in which the last entry, such as HYH 200F may be removed according to the present invention. First, the target address of the new entry is confirmed to be the address of the last entry 05 and the new entry data itself 000 is confirmed to be neutral with respect to the error checking logic 108 (FIG. 4A). Next, the last entry HYH 200F is removed and processed through the error checking logic 108; the new entry 200J replaces the former last entry (FIG. 4B). The former last entry HYH 200F is then discarded (FIG. 4C) with only one entry being processed through the error checking logic 108. Finally, the pointer is decremented such that the entry 200E (KVB) in the space with the address 04 becomes the last entry (FIG. 4D).

Figure 5A:
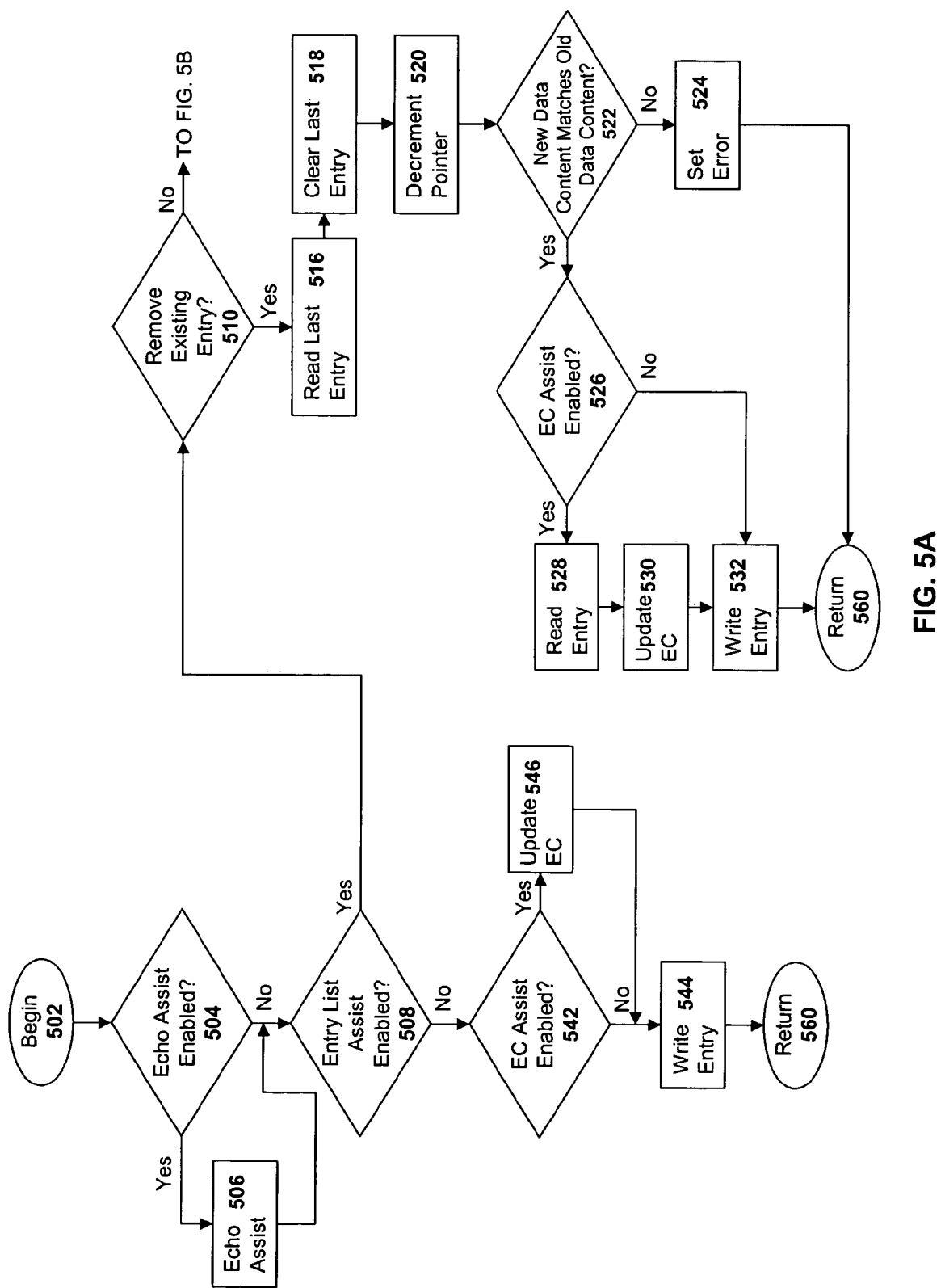
FIGS. 5A and B are a flow diagram of the memory list assist logic in accordance with the present invention.
Figure 5B:
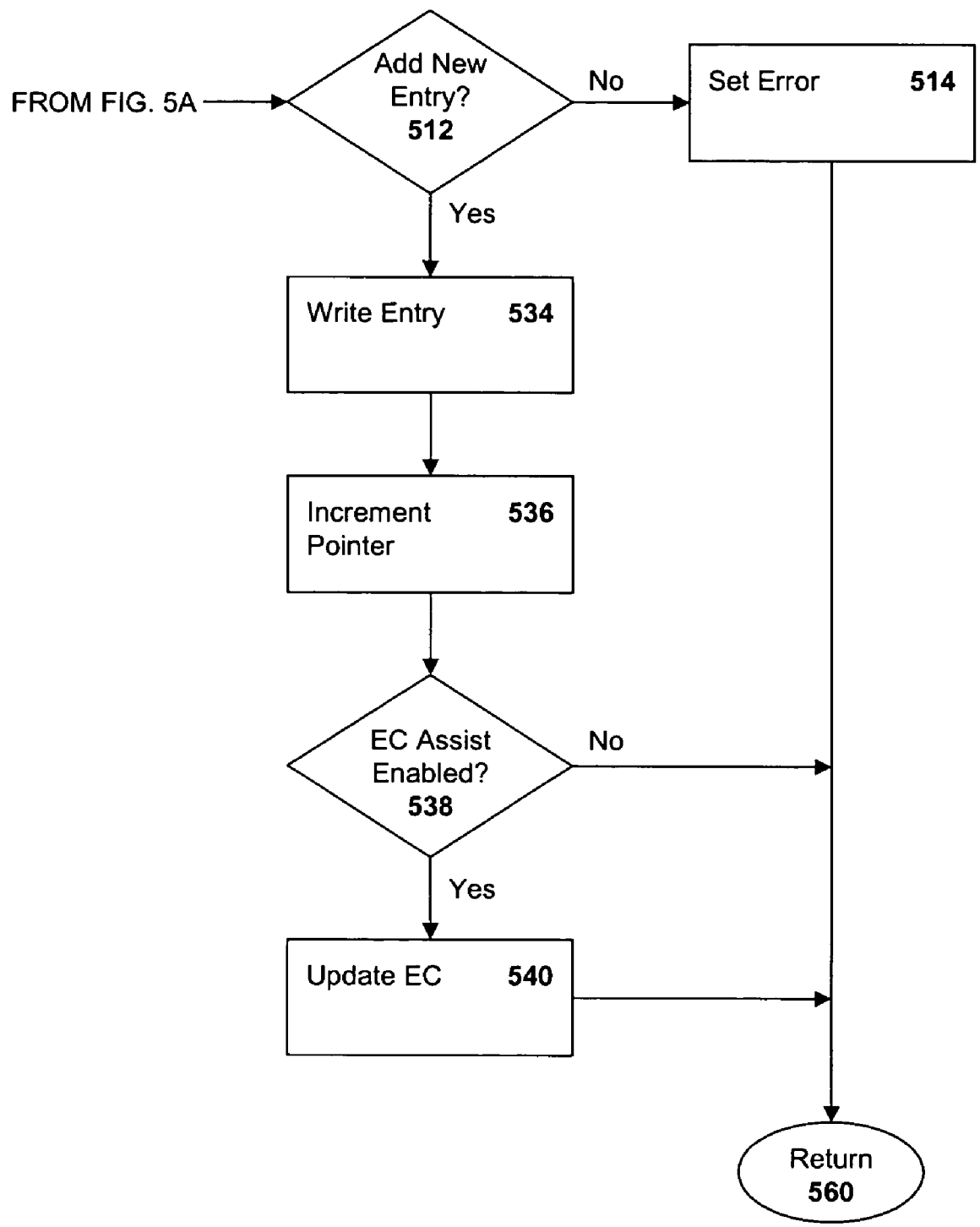

FIGS. 5A and 5B are a flow diagram of the hardware-based entry list assist logic 500 used to execute the list management protocol of the present invention after the entry list has been built. The scope of the present invention is not limited to the steps being performed in the order described herein; it will be appreciated that the steps may be performed in other orders. After the logic is invoked (502), a determination is made whether ECHO assist logic has been enabled (504). ECHO assist (506) is described and claimed in the aforementioned commonly-assigned and co-pending U.S. application Ser. No. 10/990,882 and will not be described herein. If ECHO assist is not enabled, or upon completion of the ECHO assist if it is enabled, a determination is made whether the entry list assist of the present invention is enabled (508). If so, a determination is next made whether an entry (an interstitial entry or a last entry) is to be updated (510) or, if not, made whether there is space to add a new entry (512) to the list 110. More specifically, the target address of the new entry is checked to determine if it is the same as the address of an existing entry or if it is the same as the address of the next available space in the list (that is, the target address is a valid list address). If neither decision is affirmative, then an error is likely indicated and an appropriate flag is set (514) after which the logic returns control to the original process (560).

If an existing entry is to be updated (510), the last entry in the list 110 is read (516) and replaced in the last space with a value, such as all 0's, which is neutral relative to the error checking logic 108 (518) and the address pointer (which actually designates the addresses of the entry spaces) is decremented (520) such that the next entry now becomes the last entry. A comparison is then made between the new entry and the old last entry (522). If the two do not match, an error is logged (524) and the process returns (560). If the two entries match and if the error checking logic is enabled (526), the entry being updated is read (528) and processed through the error checking logic to update the error check value (530). If the error checking assist is disabled (526), or after the error check value has been updated, the new entry is written (stored) in the existing space (532) and control returns (560).

If a new entry is to be added to the list and there is space available at the end of the list (512), the new entry is written to the empty space (534) and the address pointer is incremented (536), thereby making the new entry the Last Entry and adjusting the addresses of the other entries. If the error checking logic is enabled (538), the new entry is processed and the error check value updated (540). If the error checking logic is disabled, or upon updating the error check value if the error checking logic is enabled, control returns (560).

If the assist logic is disabled (508), a decision is made whether the error checking logic is enabled (542). If not, the entry is merely written to the list (544) and control returns (560). Otherwise, the entry is and processed through the error checking logic (546) before being written to the list (544). Control is then returned (560).

Consequently, because the read, compare, error detection and write operations are performed by the entry list assist logic 110, the burden on other system resources is reduced. Additionally, the list protocol reduces the risk of unintended writes to the entry list, thereby improving its reliability.

It is important to note that while the present invention has been described in the context of a fully functioning data processing system, those of ordinary skill in the art will appreciated that the processes of the present invention are capable of being distributed in the form of a computer readable medium of instructions and a variety of forms and that the present invention applies regardless of the particular type of signal bearing media actually used to carry out the distribution. Examples of computer readable media include recordable-type storage media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to an apparatus, the need in the art may also be met by a method of efficient maintenance of memory list, a computer program product containing instructions for efficient maintenance of memory list, or a method for deploying computing infrastructure comprising integrating computer readable code into a computing system for efficient maintenance of memory list.

What is claimed is:

1. A method for managing a memory list in a data management system, comprising:
   allocating a plurality of spaces to a memory entry list, each space being assigned an address from a sequence of addresses beginning with a lowest address;
   building the entry list by writing a first entry to the space with the lowest address and only writing each subsequent new entry to a next available space with a next higher address in the sequence, the next higher address being the then current highest used address;
   after adding an entry to the list, setting a pointer to reference the address of the added entry;
   removing an interstitial entry from the list by writing the entry with the then current highest used address in the list to the address of the interstitial entry and decrementing the pointer from the then current highest used address to the next lowest address in the sequence; and
   removing the last entry from the list by decrementing the pointer from the then current highest used address to the next lowest address in the sequence.

2. The method of claim 1, further comprising:
   performing an error checking procedure as each of the entries is added to the list to generate an error check value, and wherein:
   removing an interstitial entry further comprises updating the error check value by performing an error checking procedure only on the interstitial entry as the interstitial entry as the interstitial entry is being removed; and
   removing a last entry further comprises updating the error check value by performing an error checking procedure only on the last entry as the last entry is being removed.

3. The method of claim 2, wherein removing an interstitial entry further comprises:
   replacing the last entry with a predetermined value which is neutral with respect to the error checking procedure.

4. The method of claim 2, wherein removing the last entry further comprises:
   replacing the last entry with a predetermined value which is neutral with respect to the error checking procedure.

5. The method of claim 2, wherein the error checking procedure comprises a longitudinal redundancy check.

6. A data management system, comprising:
   a controller processor coupled to a data source;
   a memory entry list in which data entries from the data source are storable; and
   entry list assist logic coupled to the controller processor, comprising:
   logic for allocating a plurality of spaces to the list, each space being assigned an address from a sequence of addresses beginning with a lowest address;
   logic for building the entry list by writing a first entry to the space with the lowest address and only writing each subsequent new entry to a next available space with a next higher address in the sequence, the next higher address being the then current highest used address;
   after adding an entry to the list, setting a pointer to reference the address of the added entry;
   logic for removing an interstitial entry from the list by writing the entry with the then current highest used address in the list to the address of the interstitial entry and decrementing the pointer from the then current highest used address to the next lowest address in the sequence; and
   logic for removing the last entry from the list by decrementing the pointer from the then current highest used address to the next lowest address in the sequence.

7. The system of claim 6, further comprising error checking logic, comprising:
   logic for performing an error checking procedure as each entry is added to the list to generate an error check value;
   logic for updating the error check value by performing an error checking procedure only on an interstitial entry as the interstitial entry is being removed; and
   logic for updating the error check value by performing an error checking procedure only on a last entry as the last entry is being removed.

8. The system of claim 7, wherein the logic for removing an interstitial entry comprises:
   logic for replacing the last entry with a predetermined value which is neutral with respect to the error checking procedure.

9. The system of claim 7, wherein the logic for removing the last entry comprises:
   replacing the last entry with a predetermined value which is neutral with respect to the error checking procedure.

10. The system of claim 7, wherein the error checking logic comprises longitudinal redundancy check logic.

11. A computer program product of a computer readable medium usable with a programmable computer, the computer program product having computer-readable code embodied therein for managing a memory list in a data management system, the computer-readable code comprising instructions for:
    allocating a plurality of spaces to a memory entry list, each space being assigned an address from a sequence of address beginning with a lowest address;
    building the entry list by writing a first entry to the space with the lowest address and only writing each subsequent new entry to a next available space with a next higher address in the sequence, the next higher address being the then current highest used address;
    after adding an entry to the list, setting a pointer to reference the address of the added entry;
    removing an interstitial entry from the list by writing the entry with the then current highest used address in the list to the address of the interstitial entry and decrementing the pointer from the then current highest used address to the next lowest address in the sequence; and
    removing the last entry from the list by decrementing the pointer from the then current highest used address to the next lowest address in the sequence.

12. The computer program product of claim 11, the instructions further comprising instructions for:
    performing an error checking procedure as each entry is added to the list to generate an error check value;
    updating the error check value by performing an error checking procedure only on an interstitial entry as the interstitial entry is being removed; and
    updating the error check value by performing an error checking procedure only on a last entry as the last entry is being removed.

13. The computer program product of claim 12, wherein the instructions for removing an interstitial entry further comprise instructions for:

replacing the last entry with a predetermined value which is neutral with respect to the error checking procedure.

14. The computer program product of claim 12, wherein the instructions for removing the last entry comprise instructions for:
   determining that the new entry data comprises a predetermined value and that the address of a new entry equals the address of the last entry; and
   writing the predetermined value to the last address following the update to the error check value replacing the last entry with a predetermined value which is neutral with respect to the error checking procedure.

15. The computer program product of claim 12, wherein the instructions for performing an error checking procedure comprise instructions for performing a longitudinal redundancy check.

16. A method for deploying computing infrastructure, comprising integrating computer readable code into a computing system, wherein the code in combination with the computing system is capable of performing the following:
   allocating a plurality of spaces to a memory entry list, each space being assigned an address from a sequence of addresses beginning with a lowest address;
   building the entry list by writing a first entry to the space with the lowest address and only writing each subsequent new entry to a next available space with a next higher address in the sequence, the next higher address being the then current highest used address;
   after adding an entry to the list, setting a pointer to reference the address of the added entry;
   removing an interstitial entry from the list by writing the entry with the then current highest used address in the list to the address of the interstitial entry and decrementing the pointer from the then current highest used address to the next lowest address in the sequence; and
   removing the last entry from the list by decrementing the pointer from the then current highest used address to the next lowest address in the sequence.

17. The method of claim 16, wherein the code in combination with the computing system is further capable of performing the following:
   performing an error checking procedure as each entry is added to the list to generate an error check value;
   updating the error check value by performing an error checking procedure only on an interstitial entry as the interstitial entry is being removed; and
   updating the error check value by performing an error checking procedure only on a last entry as the last entry is being removed.

18. The method of claim 17, wherein the code in combination with the computing system is further capable of performing the following:
   replacing the last entry with a predetermined value which is neutral with respect to the error checking procedure.

19. The method of claim 17, wherein the code in combination with the computing system is further capable of removing the last entry by performing the following:
   replacing the last entry with a predetermined value which is neutral with respect to the error checking procedure.

20. The method of claim 17, wherein the code in combination with the computing system is further capable of performing an error checking procedure by performing a longitudinal redundancy check.

* * * * *